Figure 1:
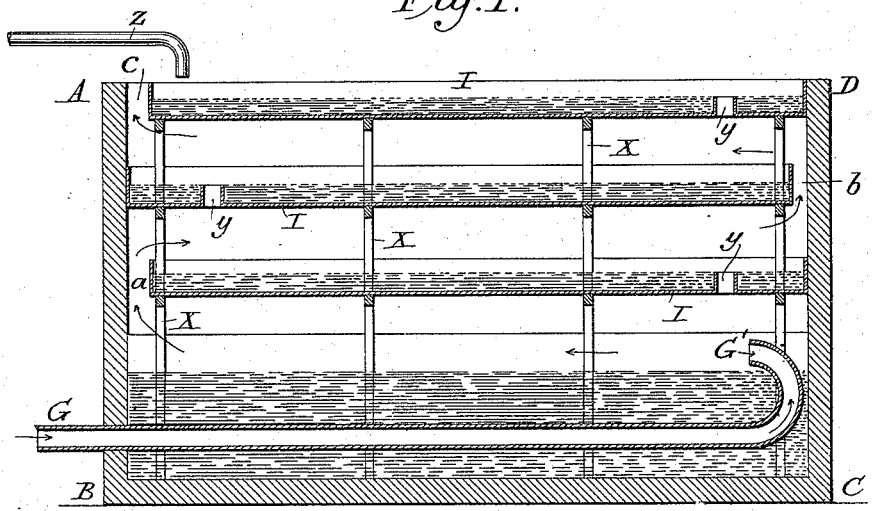

(No Model.)

D. P. FERRO CARDOZO.
EVAPORATING APPARATUS.

No. 542,626. Patented July 16, 1895.

Witnesses:

Inventor,
DANIEL P. FERRO CARDOZO
by his attorneys,

UNITED STATES PATENT OFFICE.

DANIEL P. FERRO CARDOZO, OF NEW YORK, N. Y.

EVAPORATING APPARATUS.

SPECIFICATION forming part of Letters Patent No. 542,626, dated July 16, 1895.

Application filed September 26, 1894. Serial No. 524,181. (No model.)

*To all whom it may concern:*

Be it known that I, DANIEL P. FERRO CARDOZO, a citizen of the Republic of Brazil, residing in the city, county, and State of New York, have invented certain new and useful Improvements in Evaporating Apparatus, of which the following is a specification.

My invention is in general applicable for the evaporation, concentration, or drying of various materials, but is more especially intended to effect the concentration of saline and saccharine solutions for the manufacture of salt and sugar. It may be used in connection with the process claimed by me in Letters Patent No. 508,915, granted November 21, 1893, to effect the final concentration of the saline solution after the impurities have been precipitated or deposited therefrom, as described in said patent.

The apparatus may be used in other processes of a like nature, but is also adapted to accomplish the entire operation of concentration of such solutions for the production of salt, sugar, &c.

In my improved apparatus I effect the heating and evaporation of the solution by a current of hot air which is conducted through a pipe or passage-way, preferably flat and relatively wide with reference to its thickness, immersed in a quantity of the solution in the bottom of the tank or apparatus, but having its end opening above the surface of the liquid. Above such accumulation of liquid are arranged a series of open flat pans, under and over which the current of hot air is caused to pass in a sinuous or to-and-fro course. The hot air therefore heats the solution in the bottom of the tank by radiation and convection from the pipe or passage-way passing through the solution and also by the contact of the hot air with the surface of the solution. The series of open pans are also respectively heated by the hot air passing in contact with their bottoms and in contact with the surfaces of the solution therein. At the same time active evaporation is promoted by the passage of the current of air across and in contact with the surfaces of the solution. The pans may be of any desired number and are preferably arranged one above another in horizontal or substantially horizontal planes within a rectangular tank or casing, from which the air is finally discharged into the atmosphere. This tank is constructed with closely-fitting hinged side doors, by which access may be had to the bottom of the tank and to the several pans for the removal of the precipitated or crystallized salt, sugar, &c. I prefer that each pan shall be provided with an overflow-pipe to deliver the excess of any solution in any one pan to the pan next beneath it and finally to the bottom of the tank.

Figure 2:
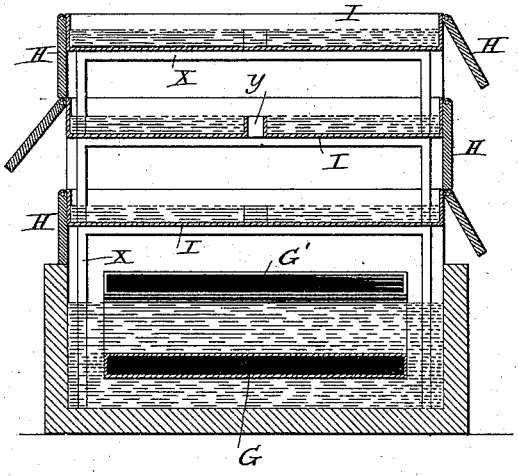

In the accompanying drawings, Figure 1 is a longitudinal vertical section through the apparatus, and Fig. 2 a transverse section.

The tank or casing is marked A B C D.

X are the frames or supports that carry the open pans I, arranged one above another, and the adjoining pans having their respective opposite ends abutting against opposite walls of the casing, the passage-ways $a\ b\ c$ being left between the other ends of the pans and the walls of the casing.

$y\ y\ y$ indicate the overflow-pipes in the pans, and G the thin flat pipe or passage for the introduction of the hot air at the bottom of the tank. This pipe enters one side of the casing and extends approximately to the other side, where it curves or turns upwardly so that its mouth G' is above the solution in the bottom of the tank, and delivers the hot air against or parallel with the surface of the solution.

Z indicates the supply-pipe for delivering the solution to be treated into the upper pan.

H indicates hinged side portions that permit access to the pans and tank.

The construction being of great simplicity will readily be understood. The supply of solution delivered at Z is of course regulated to the volume and temperature of the hot air, so that the accumulation of solution in the bottom of the tank will never overflow into the pan-mouth G' of the hot-air passage. The air is delivered to the pipe G from any suitable furnace or apparatus, and if desired, in order to promote a more efficient evaporation, the air may have been treated to remove moisture therefrom by passing it through chloride of lime or other hydroscopic medium. The arrows indicate the direction of the current of hot air and the operation will be plain from the foregoing description. From time to time the doors H may be opened and the precipitated or crystallized salt, sugar, &c., removed therefrom.

I claim as my invention—

1. An evaporating apparatus comprising the combination of a tank having an air and vapor outlet, a hot air supply pipe entering one side thereof near the bottom, extending approximately to the opposite side, and then having its end turned upwardly so as to deliver the hot air at a suitable distance above the bottom of the tank, an open pan arranged within the tank above the outlet of the hot air pipe, a hot air passage-way at the end of the tank opposite the mouth of the hot air pipe, and means for supplying to the pan the liquid to be evaporated, the organization being such that the hot air pipe at the bottom of the tank is submerged in the liquid that is being evaporated.

2. An evaporating apparatus consisting of a tank having supported therein a series of flat open pans arranged one above another, each having an overflow pipe arranged in its bottom, with passage ways between the walls of the tank and the opposite ends of adjoining pans, a hot air supply pipe entering the bottom of the tank and having its mouth or inner end arranged to deliver the hot air above the bottom of the tank, and a supply pipe for delivering the solution to be evaporated to the upper pan, substantially as and for the purpose set forth.

3. The combination of a tank, a flat hot air pipe entering one side thereof, extending approximately to the opposite side and then having its end curved upwardly so that its discharge mouth delivers the hot air therefrom horizontally, or substantially so, a series of open pans arranged above the hot air pipe, and passage ways between the opposite ends of adjoining pans and the wall of the tank, each pan being provided with an overflow conduit to deliver an excess of solution therein to the pan next below it, and finally to the bottom of the tank, the discharge mouth of the hot air pipe being arranged under the lower pan at the side of the casing opposite the passage way, between the pan and the walls of the casing, and a supply pipe for delivering the regulated quantity of solution to the upper pan.

4. The combination of a tank, a flat hot air pipe entering one side thereof, extending approximately to the opposite side and then having its end curved upwardly so that its discharge mouth delivers the hot air therefrom horizontally, or substantially so, a series of open pans arranged above the hot air pipe, passage ways between the opposite ends of adjoining pans and the walls of the tank, each pan being provided with an overflow conduit to deliver an excess of solution therein to the pan next below it, and finally to the bottom of the tank, the discharge mouth of the hot air pipe being arranged under the lower pan at the side of the casing opposite the passage way, between the pan and the walls of the tank, a supply pipe for delivering a regulated quantity of solution to the upper pan, and normally closed doors in the side of the tank to afford access to the pans and the bottom of the tank, substantially as and for the purpose set forth.

5. The combination of the tank, having an air or vapor outlet a hot air pipe relatively wide and flat, entering the side of the tank, extending approximately to the opposite side thereof and having its end curved upwardly so that its discharge mouth delivers the hot air therefrom horizontally or substantially so, at a suitable distance above the bottom of the tank, an open pan arranged above the mouth of the hot air pipe and leaving a hot air passage-way at the end opposite the mouth of said pipe, and means for delivering the liquid to be evaporated in a regulated quantity to the pan, the organization being such that the excess of liquid in the pan overflows into the bottom of the tank, and the hot air pipe is submerged in the liquid accumulated at the bottom of the tank, substantially as set forth.

In testimony whereof I have hereunto subscribed my name.

D. P. FERRO CARDOZO.

Witnesses:
 FRANK S. OBER,
 GUY E. DAVIS.